(12) United States Patent
Bascom et al.

(10) Patent No.: US 8,640,350 B2
(45) Date of Patent: Feb. 4, 2014

(54) LASER LINE GENERATOR HAVING THREE INTERSECTING LIGHT PLANES

(71) Applicant: Black & Decker Inc., Newark, DE (US)

(72) Inventors: James P. Bascom, Bel Air, MD (US); Jia Yong Jiang, Suzhou (CN); Xiang Wang, Suzhou (CN); Sheng Tao Xie, Suzhou (CN); Wei Hua Si, Suzhou (CN); Daniel K. Hardy, York, PA (US)

(73) Assignee: Black & Decker, Inc., Newark, DE (US)

( * ) Notice: Subject to any disclaimer, the term of this patent is extended or adjusted under 35 U.S.C. 154(b) by 0 days.

(21) Appl. No.: 13/672,768

(22) Filed: Nov. 9, 2012

(65) Prior Publication Data

US 2013/0074352 A1    Mar. 28, 2013

Related U.S. Application Data

(63) Continuation of application No. 12/769,937, filed on Apr. 29, 2010, now Pat. No. 8,307,562.

(51) Int. Cl.
*G01C 15/00*    (2006.01)
*G01B 11/26*    (2006.01)

(52) U.S. Cl.
USPC .......................... 33/286; 33/283; 33/DIG. 21

(58) Field of Classification Search
USPC ...................... 33/286, 283, DIG. 21
See application file for complete search history.

(56) References Cited

U.S. PATENT DOCUMENTS

| | | | | |
|---|---|---|---|---|
| 5,243,398 | A * | 9/1993 | Nielsen | 356/138 |
| 6,183,129 | B1 * | 2/2001 | Aoyama et al. | 374/121 |
| 6,195,901 | B1 * | 3/2001 | Falb | 33/286 |
| 6,604,293 | B2 * | 8/2003 | Hamada | 33/290 |
| 6,606,798 | B2 * | 8/2003 | El-Katcha et al. | 33/290 |
| 7,730,624 | B2 * | 6/2010 | Nishimura et al. | 33/286 |
| 8,307,562 | B2 * | 11/2012 | Bascom et al. | 33/286 |
| 2009/0030558 | A1 * | 1/2009 | Rogers et al. | 700/297 |

* cited by examiner

*Primary Examiner* — Christopher Fulton
(74) *Attorney, Agent, or Firm* — Michael Aronoff (57) ABSTRACT

An improved laser line generating device is provided for use in construction layout tasks. The laser line generating device is comprised of a first laser light generator operable to emit from a housing a first plane of light having a fan angle greater than 180° and arranged in the housing to project the first plane of light perpendicular to a horizontal plane; and a second laser light generator operable to emit from the housing a second plane of light having a fan angle greater than 180° and arranged in the housing to project the second plane of light perpendicular to the first plane of light and perpendicular to the horizontal plane, such that the first plane of light intersects with the second plane of light at two points.

17 Claims, 8 Drawing Sheets

LASER LINE GENERATOR HAVING THREE INTERSECTING LIGHT PLANES

CROSS REFERENCE TO RELATED APPLICATION(S)

This application is a continuation of U.S. patent application Ser. No. 12/769,937, filed Apr. 29, 2010, now U.S. Pat. No. 8,307,562 issued Nov. 13, 2012; the entire contents of which are hereby incorporated by reference.

FIELD

The present disclosure relates to an improved laser line generating device for assisting with construction layout tasks.

BACKGROUND

Laser line generators are commonly used for construction layout. For example, laser line generators may be used to partition an open space in a commercial building into useable office areas. In this example, the laser line generator generates squared lines on a floor which are in turn used to construct walls or cubicles. At some later time, it may be desirable to transfer the squared lines from the floor to the ceiling or visa versa. In other instances, it may be desirable to generate squared lines on the ceiling and floor simultaneously. In any case, what is needed is an improved laser line generator for assisting with construction layout tasks. The laser line generator should be operable to generate two laser plumb beams at right angle to each other and intersecting each other to form a crosshair above and below the device.

This section provides background information related to the present disclosure which is not necessarily prior art.

SUMMARY

An improved laser line generating device is provided for use in construction layout tasks. The laser line generating device is comprised of a first laser light generator operable to emit from a housing a first plane of light having a fan angle greater than 180° and arranged in the housing to project the first plane of light perpendicular to a horizontal plane; and a second laser light generator operable to emit from the housing a second plane of light having a fan angle greater than 180° and arranged in the housing to project the second plane of light perpendicular to the first plane of light and perpendicular to the horizontal plane, such that the first plane of light intersects with the second plane of light at two points.

The laser line generating device further includes a third laser light generator operable to emit, from the housing, a third plane of light having a fan angle greater than 90° and arranged in the housing to project the third plane of light perpendicular to the first and the second plane of light, such that the third plane of light intersects with both the first and second planes of light.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Figures 1, 3:
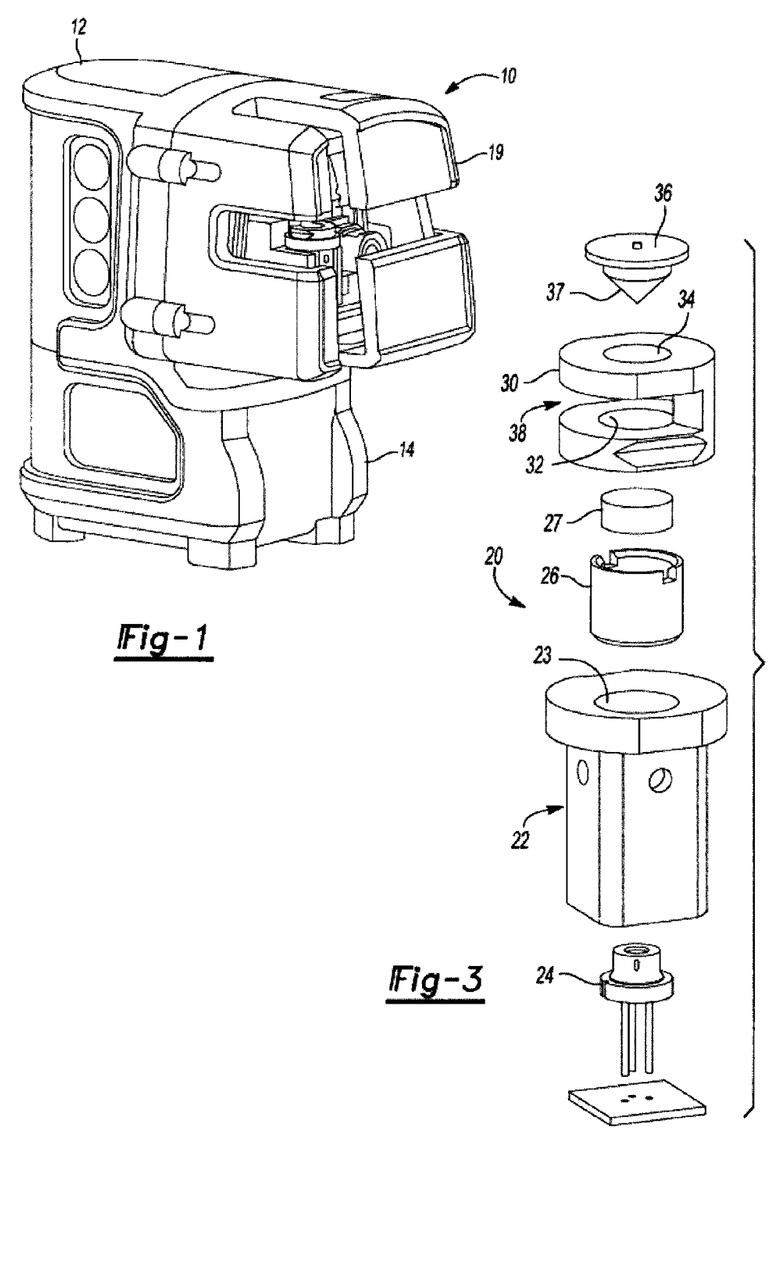
FIG. 1 is a perspective view of an exemplary laser line generating device.
FIG. 3 is an exploded view of an exemplary laser module.
Figure 2:
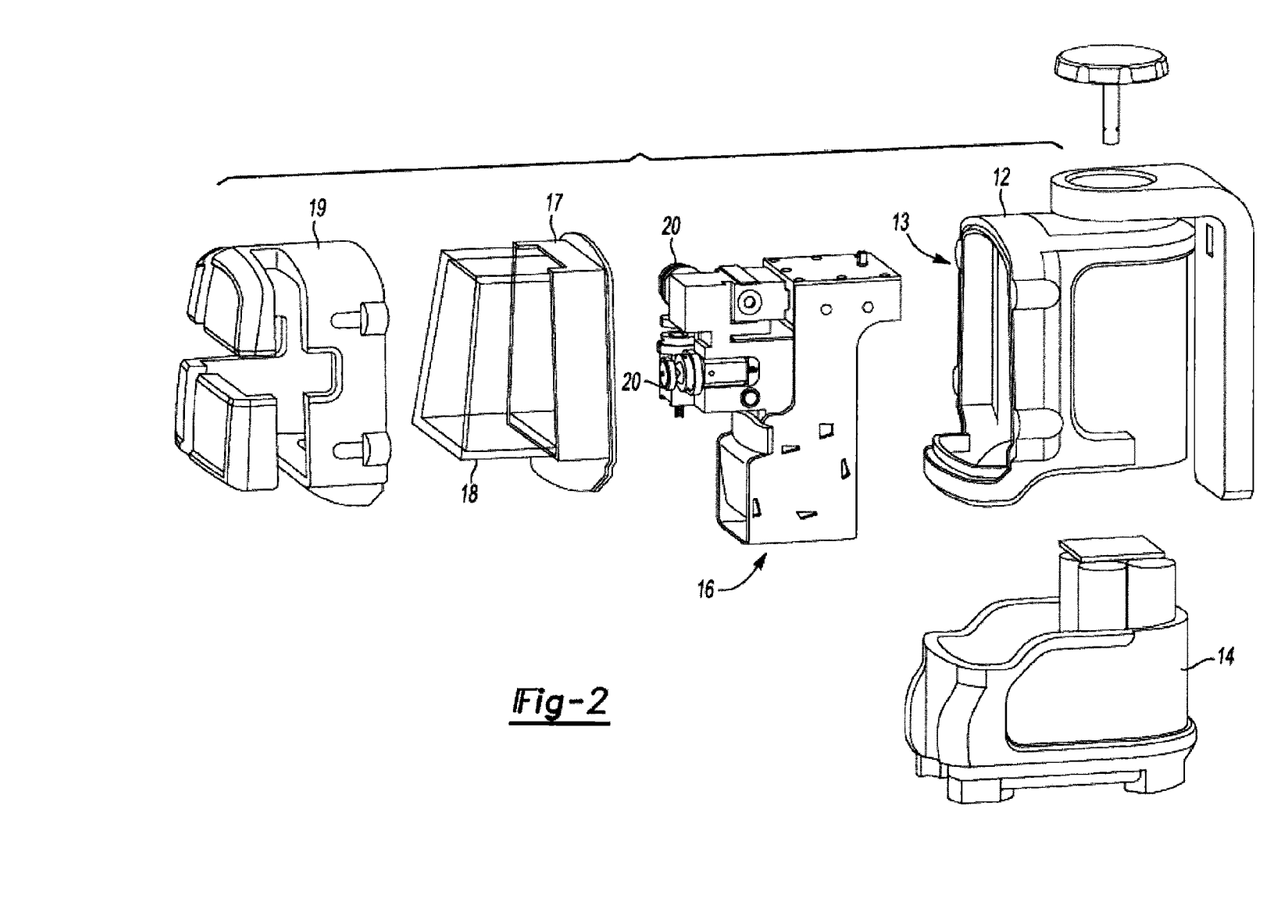
FIG. 2 is an exploded view of the exemplary laser line generating device.

FIGS. 1 and 2 illustrate an exemplary laser line generating device 10. The laser line generating device 10 is constructed primarily from an upper housing 12 and a lower housing 14 which mate together to form a cavity therein. A laser assembly 16 is disposed in the cavity formed by the upper and lower housings 12, 14. In an exemplary embodiment, the upper and lower housings 12, 14 are formed by injection molding using a suitable plastic material although other materials are contemplated by this disclosure.

The laser assembly 16 includes multiple laser modules 20 which protrude through an aperture 13 formed in the upper housing 12. A transparent enclosure 18 attaches to the upper housing 12 and encases the protruding laser modules therein. The laser modules are operable to emit planes of light through the transparent enclosure 18. By positioning the laser modules outside the upper housing 12, planes of light emitted by the laser modules are not blocked by the housing and are able to achieve fan angles greater than 180 degrees as further described below. In an exemplary embodiment, the transparent enclosure 18 has a cuboid shape, where each planar surface of the cuboid is made of glass. Other shapes and materials for the enclosure are within the scope of this disclosure. The transparent enclosure 18 may be coupled to the upper housing using an isolating member 17. To protect the glass enclosure from inadvertent damage, the enclosure 18 is surrounded by a metal roll cage 19. The roll cage 19 is configured with multiple slots that enable the planes of light to be emitted outwardly from the device.

Construction of an exemplary laser module is shown in FIG. 3. The laser module 20 includes a fixture 22 having a cylindrical passage 23 formed therein along a longitudinal axis of the fixture 22. A laser diode 24 is press fit into the passage 23 on one side of the fixture 22 and a lens holder 26 is inserted into the passage 23 on the other side of the fixture 22, where the lens holder 26 is configured to retain a collimating lens 27. A mirror holder 30 is affixed to the fixture 22 at the lens holder end of the housing, such that a cylindrical recess 32 formed in the mirror holder 30 is aligned with the passage 23 of the fixture 22. A sleeve 34 adapted to receive a reflective element 36 is formed in a surface of the mirror holder 30 opposing the surface abutted with the fixture 22. In the exemplary embodiment, the reflective element is a mirror having a conical reflecting surface 37.

In operation, the laser diode 24 emits a beam of light upward into the passage 23. The beam of light is collimated as it passes through collimating lens 27. The collimated beam of light is incident upon the conical surface of the reflective element 36. The conical surface in turn reflects the beam of light outward to form a plane of light that is substantially at 90 degrees to an axis of the collimated beam of light. An output aperture 38 in the mirror holder 30 permits the plane of light to radiate at a fan angle greater than 180° and preferably at an angle of 230°. It is readily understood that the fan angle and power distribution of the plane can be changed by adjusting the offset between the collimating lens 27 and the reflective element 36.

Figure 4A:
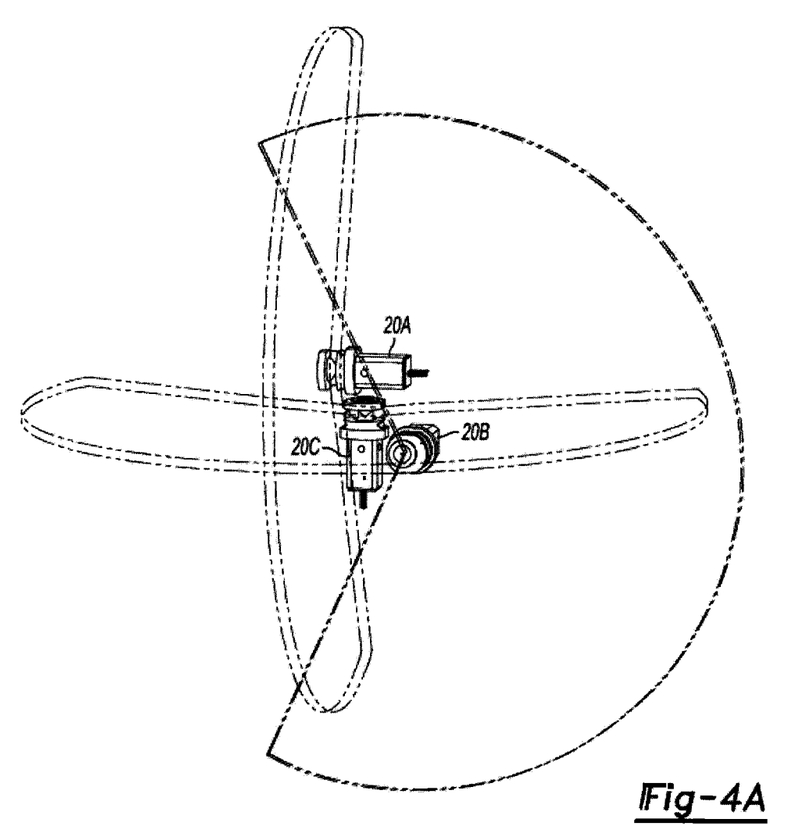
FIG. 4A is a diagram illustrating an exemplary arrangement for the laser modules which comprise the laser line generating device.

With reference to FIG. 4A, three laser modules 20 are arranged at right angles to each other, thereby generating three different light planes. A first laser module 20A is arranged to project a first plane of light perpendicular to a horizontal plane; and a second laser module 20B is arranged to project a second plane of light perpendicular to the first plane of light and perpendicular to the horizontal plane, such that the first plane of light intersects with the second plane of light along an axis of intersection. This intersection forms a cross hair above and below the unit. In other words, the first and second laser modules generate two vertically aligned planes of light. A third laser module 20C is arranged to project a third plane of light that is perpendicular to the first and the second plane of light, such that the third plane of light intersects with both the first and second planes of light. In other words, the third laser module generates a horizontal plane of light that is substantially parallel with the ground. Although the third plane of light is shown having a fan angle greater than 180 degrees, it is understood that its fan angle need only be greater than 90 degrees in order to intersect with both the first and second planes of light.

Figure 4B:
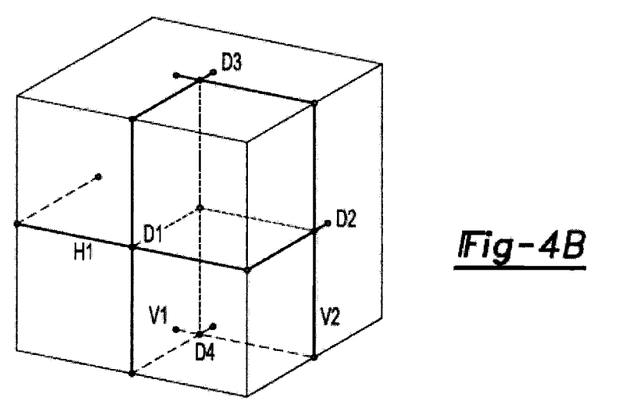
FIG. 4B is a diagram illustrating the reference coordinate system generated by the laser line generating device.

Since each of the light planes have large fan angles, the three light planes will intersect each other at four distinct cross points as best seen in FIG. 4B. In the context of a room, the laser line generating device places a cross point D3 on the ceiling and another cross point D4 on the floor, thereby forming a plumb line between the two points. Each of these cross points D3, D4 form crosshairs on a reflecting surfaces that may be used to generate squared lines. The remaining two cross points D1, D2 are projected onto the side walls of the room and likewise form crosshairs on the reflecting surfaces. In any application, the three light planes and four cross points form a reference coordinate system that may be readily used by carpenters and other types of contractors for construction layout tasks.

Another aspect of this disclosure addresses an exemplary technique for positioning and calibrating the three laser modules. Ideally, each laser module generates a plane of light perpendicular to the beam axis of the corresponding collimated beam and the beam axis is in parallel with a longitudinal axis of the cylindrical passage formed in the fixture of the laser module. However, in practice, there is always some error between the plane of light, the beam axis and the longitudinal axis. This error may be compensated for using the technique described below.

Figure 5:
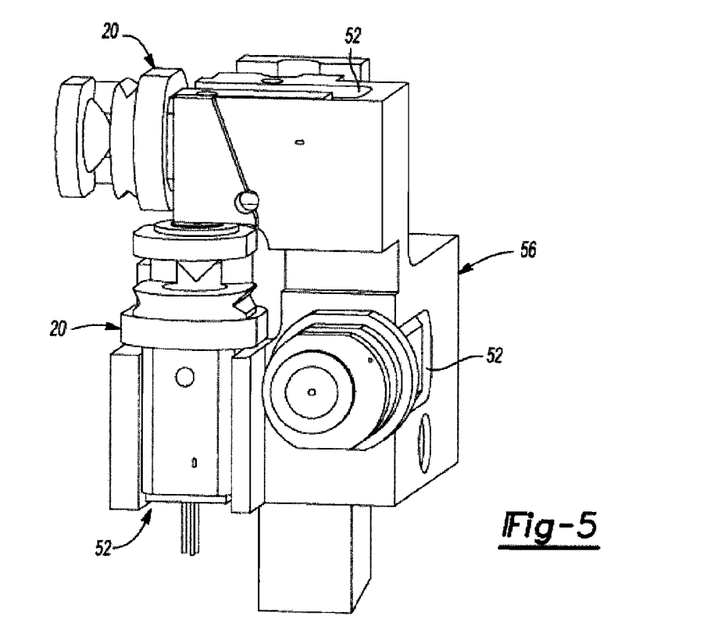
FIG. 5 is a perspective view of an exemplary chassis housing the laser modules of the laser line generating device.

First, the three laser modules 20 are positioned at right angles to each other. The output apertures are positioned such that the plane of light emitted therefrom is not blocked by any of the other modules. FIG. 4A depicts an exemplary arrangement for the laser modules 20 although other arrangements are also contemplated by this disclosure. A chassis 56 is constructed to support and retain the laser modules 20 in these positions as shown in FIG. 5. The chassis 56 is designed to fill up the space between the laser modules. In the exemplary embodiment, the chassis 56 includes three distinct recesses 52, one for each laser module. Each recess is defined by at least one surface that contacts a laser module. In this way, the recesses are configured to restrict movement of a laser module disposed therein to pivoting about a single rotational axis prior to the laser module being secured in place. The contacting surfaces of the recesses also help retain the position of the laser module and provide good bonding strength when the modules are secured in place by gluing or applying some other fastener between the laser module and the contacting surfaces of the chassis.

Figure 6:
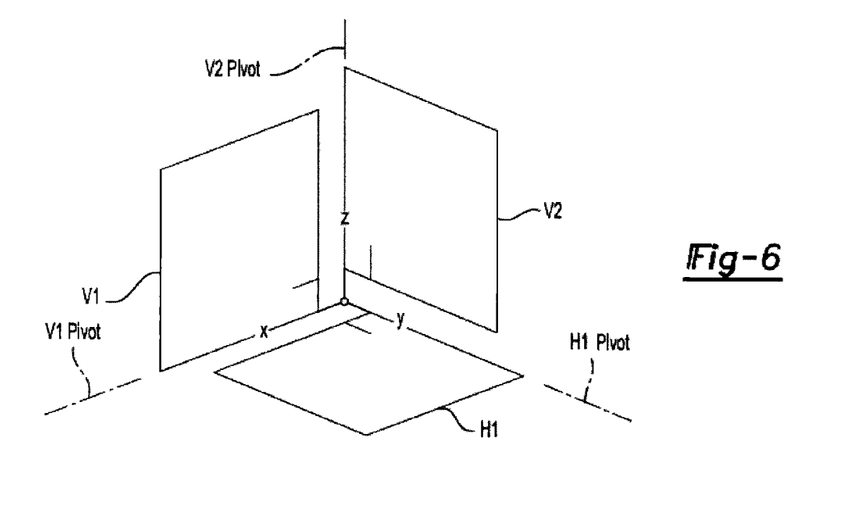
FIG. 6 is a diagram illustrating how the laser modules are calibrated in relation to each other.

During calibration, each laser module will have a pivot axis which enables correction of alignment errors. In the exemplary embodiment, the laser modules are calibrated by rotating each laser module about its respective pivot axis, thereby adjusting the position of the laser plane emitted therefrom in relation to the other two laser planes. With reference to FIG. 6, the laser plane H1 is first rotated about its pivot axis. The angle between laser plane H1 and laser plane V2 is monitored, measured and set to 90 degrees. Any offset in the angle from 90 degrees is referred to herein as the pitch error.

Laser plane V2 is then rotated about its pivot axis. Laser plane V2 is set in relation to laser plane V1. The angle between laser plane V2 and laser plane V1 is likewise set to 90 degrees. Any offset in the angle from 90 degrees is referred to herein as the yaw error. It is noted that movement of laser plane V2 in relation to laser plane V1 will adversely affect the calibration done for laser plane H1 in the previous step. Nonetheless, reduction in the yaw angle will exceed the increase in the pitch error such that the overall accuracy is improved.

Next, laser plane V1 is rotated about its pivot axis and set in relation to laser plane H1. The angle between laser plane V1 and laser plane H1 is set to 90 degrees. Any offset in the angle from 90 degrees is referred to herein as the roll error. As noted above, movement of laser plane V1 may adversely affect previous calibration steps. Therefore, these steps are repeated until the pitch error, yaw error and roll error fall within an acceptable tolerance range. Once the pitch error, yaw error and roll error fall within the accepted tolerance range, each laser module will be affixed permanently to the chassis.

Figure 7A:
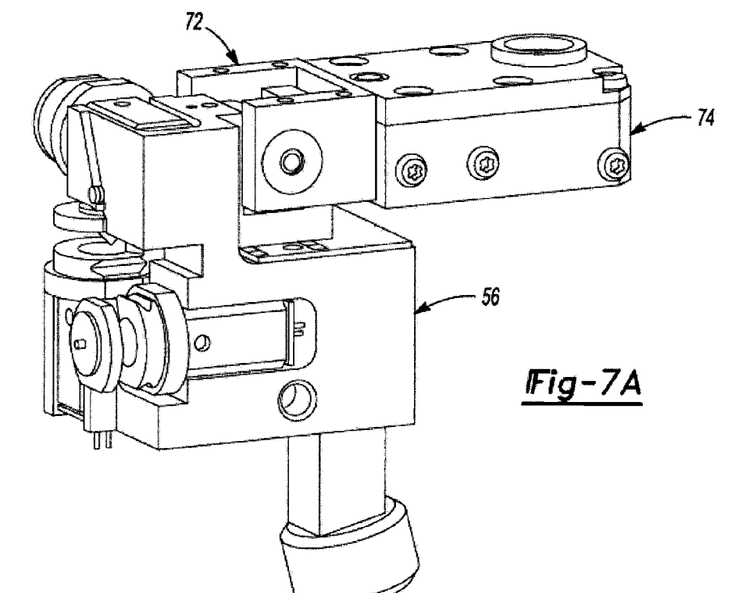
FIGS. 7A and 7B are a perspective view and a top view, respectively, illustrating an exemplary gimbal assembly coupled to the chassis.
Figure 7B:
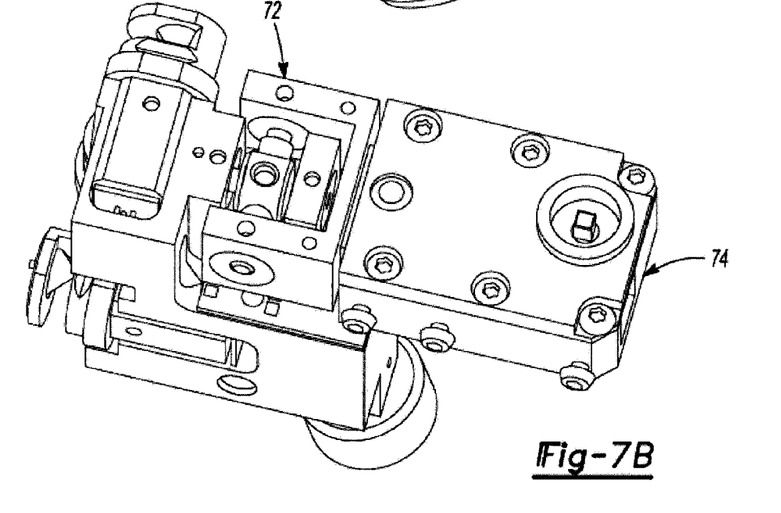
Figure 8:
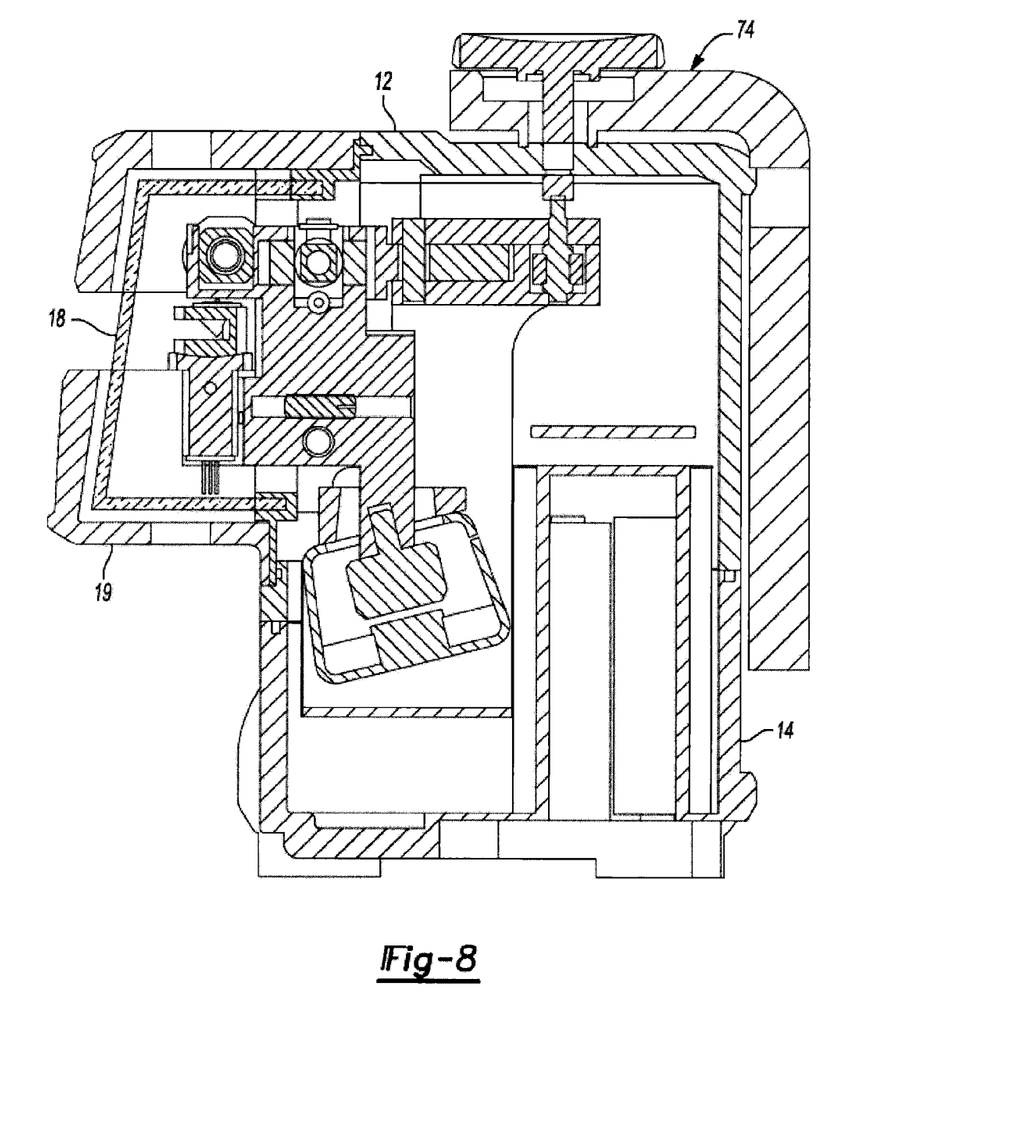
FIG. 8 is a cross-sectional view of the laser line generating device.

The laser generating device may be configured with a self leveling mechanism. For example, the chassis 56 is mounted to a gimbal assembly 72 as shown in FIGS. 7A and 7B. When the laser line generating device is resting upon a support surface, the gimbal assembly 72 ensures laser plane H1 is horizontal, i.e., the laser plane is perpendicular to the gradient of the local gravity field. While a particular gimbal assembly is shown, other types of gimbals are contemplated by this disclosure. The chassis 16 may also be equipped with an alignment adjustment mechanism 74 as shown in FIG. 8.

Figure 9:
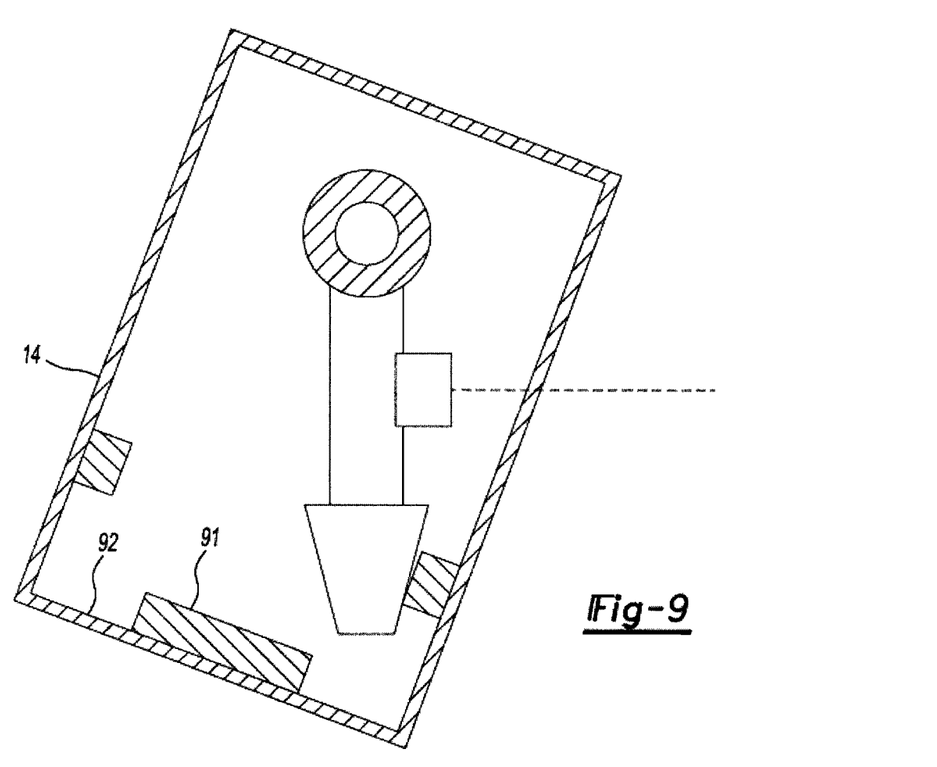
FIG. 9 is a diagram illustrating an inclinometer residing in the laser line generating device.

A self-leveling laser generating device typically triggers an alarm when the leveling mechanism reaches an end of its leveling range. A binary out-of-level sensor may be used detect the end of the leveling range. To provide a more robust user interface, the laser line generating device 10 uses an inclinometer to measure the angle of slop or tilt. In an exemplary embodiment, the inclinometer 91 is mounted to the bottom surface 92 of the lower housing 14 as shown in FIG. 9 although it may be mounted to other surfaces. Other types of measurement devices may be used in lieu of the inclinometer.

The inclinometer is in data communication with a controller that controls operation of the laser line generating device. When the laser generating device is operating within the range of the laser leveling mechanism, the plane of light emitted therefrom is parallel to the horizontal plane. Measurements from the inclinometer will be used to differentiate between when the laser generating device is tilted just outside (e.g., 5-10 degrees of slope) the range of the leveling mechanism or well outside (e.g., more than 10 degrees of slope) the range of leveling mechanism. Furthermore, the laser generating device may be configured to operate differently depending upon the amount of tilt. For example, when the laser generating device is placed on a surface such that the measure angle of tilt is near or outside of the range of the leveling mechanism, an indicator is given to the device operator. In one embodiment, the laser light is flashed on and off at a rate that is perceptible by the operator (e.g., once every second). Conversely, when the laser generating device is placed on a surface such that the measured angle of tilt is well outside of the range of the leveling mechanism, then a different indicator is provided to the device operator. In one embodiment, the laser light is flashed on and off at a much slower rate (e.g., once every twenty seconds). In another embodiment, the device operator may be intentionally positioning the laser generating device such that the emitted light is tilted in relation to the horizontal plane. Recognizing the operator's intention, the laser generating device may disable the out-of-range sensing mechanism and permit the inclined projected light.

In addition, the laser line generating device employs a unique modulation scheme to generate planes of light. As the planes of light radiate away from the device, the brightness of the light dramatically decreases with distance. It becomes difficult for users of the device to find the laser line at certain distances, especially outdoors or in other bright light environments. In these instances, laser line detectors have been used to detect the location of the laser line.

Figure 11:
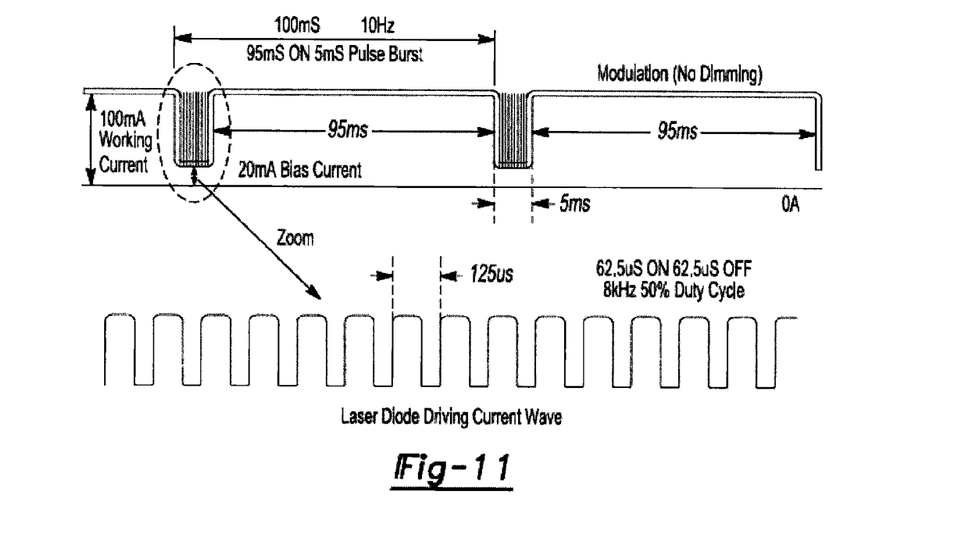
FIG. 11 is a diagram illustrating an exemplary modulation scheme used by the laser line generating device.

The light emitted from the laser diode is modulated (e.g. pulse width) with a duty cycle substantially greater than 50% as shown in FIG. 11. In an exemplary embodiment, the light is modulated at a relatively low frequency (e.g., on the order of 10 Hz) with a duty cycle in the range of 85-95% and preferably around 90%. In the exemplary embodiment, the laser may be emitted for 95 ms and turned off for 5 ms. By employing a large duty cycle, the laser line is visible to the user. Other modulation schemes are contemplated by this disclosure so long as the dimming of the beam brightness cannot be easily detected by the user (i.e., <0.5% of power). This approach results in a laser line having substantially high power and thus is visible to a user at farther distances.

The light emitted from the laser line generator may be further modulated to assist locating the laser line with a detector. In an exemplary embodiment, the laser is further modulated at a relatively high frequency (e.g., on the order of 10 kHz) during the 5 ms "off" period. This high frequency light signal is then recognized and used by the detector to determine the location of the laser at distances where the visibility of the laser fades. Rather than requiring the user to select between modulated laser line for outdoor applications and non-modulated laser line for indoor applications, the laser line generator only operates in modulated mode. Therefore, it may be feasible to eliminate the mode selection switch from the device, thereby simplifying the user interface. While the modulation scheme is described in the context of a laser line generator, it is readily understood that this modulation scheme may be employed with other types of laser devices, including laser point devices.

Figure 10:
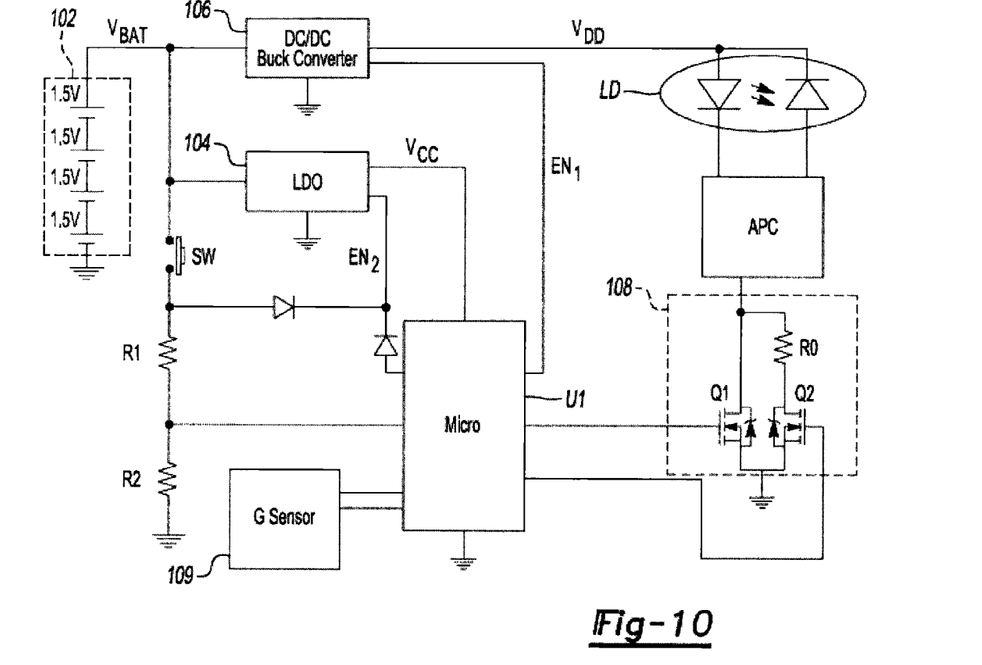
FIG. 10 is a schematic of an exemplary circuit arrangement for the laser line generating device.

FIG. 10 illustrates an exemplary circuit arrangement 100 which may be used to drive the laser diode. The circuit arrangement is comprised generally of a power supply 102 (e.g., four AA sized alkaline batteries), a linear regulator 104, a DC/DC switching power supply 106, a diode driving circuit 108, and a microprocessor U1. Of note, the diode driving circuit 108 includes a transistor Q1 connected in series with laser diode LD, where the control terminal of the transistor Q1 is coupled to and controlled by the microprocessor U1. By turning the transistor Q1 on and off, the microprocessor U1 is operable to modulate the light emitted from the laser diode LD. An inclinometer 109 may also be coupled to the microprocessor U1. Other circuit arrangements for operating the laser line generator are also within the broader aspects of this disclosure.

Turning the laser diode on and off at relatively high frequencies can damage the diode. To avoid such damage and extend the life cycle of the diode, the laser diode is biased on throughout operation. Rather than turning off the diode, power delivered to the diode is chopped to a low level but the diode remains biased on. In an exemplary embodiment, another transistor Q2 is coupled in parallel with transistor Q1. When the laser line generator is turned on by the user, the transistor Q2 is turned on first followed by transistor Q1. Transistor Q2 remains on throughout the operation of the laser line generator; whereas, transistor Q1 functions as a modulation control switch. When transistor Q1 is turned on, the full current flow is through transistor Q1. When transistor Q1 is turned off, a bias current will pass through the laser diode and then through resistor R0 and transistor Q2. The value of resistor R0 is selected so that the bias current (e.g., 20 mA) will maintain the laser diode LD is a forward bias state.

In another exemplary embodiment, a capacitor $C_D$ and resistor $R_D$ may be coupled in parallel across the laser diode LD. When the transistor Q1 is on, a driving current is delivered from the power supply to the laser diode and light is emitted from the laser diode. Additionally, the driving current will charge capacitor $C_D$ until the voltage across the capacitor equals the voltage drop across the laser diode. To modulate the light, transistor Q1 is turned off and the driving current from the power supply is no longer delivered to the laser diode. While the transistor Q1 is off, the capacitor $C_D$ will discharge its stored energy, thereby delivering a current sufficient to bias the laser on. Other techniques for biasing the laser diode on while the transistor Q1 is turned off are also contemplated.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

What is claimed is:

1. A laser line generating device, comprising:
   a housing;
   a laser light generator; and
   the laser light generator comprising a laser diode emitting a beam of light, the beam of light emitted from the laser diode being modulated and having a period including a full power portion and a reduced power portion, such that the reduced power portion is not detectable by a person.

2. A laser line generating device as set forth in claim 1, wherein the modulation frequency is approximately 10 Hz.

3. A laser line generating device as set forth in claim 1, wherein a ratio of the full power portion to a sum of the full power portion and the reduced power portion is approximately 85% to 95%.

4. A laser line generating device as set forth in claim 3, wherein the ratio of the full power portion to a sum of the full power portion and the reduced power portion is approximately 90%.

5. A laser line generating device as set forth in claim 1, wherein the full power portion is approximately 95 ms and the reduced power portion is approximately 5 ms.

6. A laser line generating device as set forth in claim 1, wherein during the period an overall power decreases by less than 0.5%.

7. A laser line generating device as set forth in claim 1, wherein the beam of light is further modulated during the reduced power portion.

8. A laser line generating device as set forth in claim 7, wherein the further modulation frequency is approximately 10 kHz.

9. A laser line generating device as set forth in claim 7, wherein the further modulation is used by a detector to determine a location of the device.

10. A laser line generating device as set forth in claim 1, wherein the diode remains on during the reduced power portion.

11. A laser line generating device as set forth in claim 1, wherein the diode receives approximately 20% current during the reduced power portion as compared to the full power portion.

12. A laser line generating device as set forth in claim 1, wherein the diode remains forward biased during the reduced power portion.

13. A laser line generating device, comprising:
    a housing;
    a laser light generator;
    the laser light generator comprising a laser diode emitting a beam of light, the diode being modulated during a modulation period by reducing power delivered to the diode without turning the diode off.

14. A laser line generating device as set forth in claim 13, further comprising a laser diode driving circuit that modulates the diode such that the modulation is not detectable by a person.

15. A laser line generating device as set forth in claim 14, wherein the driving circuit is coupled to the laser diode, the driving circuit including a first transistor in series with the laser diode, a control terminal of the first transistor coupled to a control element such that the control element controls the control terminal of the first transistor to turn the first transistor on and off to control an output of the laser diode.

16. A laser line generating device as set forth in claim 15, wherein the driving circuit further comprises a second transistor in parallel with the first transistor, a control terminal of the second transistor coupled to the control element such that the control element controls the control terminal of the second transistor to turn the second transistor on and off to control the output of the laser diode.

17. A laser line generating device as set forth in claim 16, wherein the second transistor is always on during the modulation period and the first transistor is on during a full power portion of the modulation period and is off during a reduced power portion of the modulation period.

* * * * *